(12) United States Patent
Taguchi et al.

(10) Patent No.: US 10,176,589 B2
(45) Date of Patent: Jan. 8, 2019

(54) METHOD AND SYSTEM FOR COMPLETING POINT CLOUDS USING PLANAR SEGMENTS

(71) Applicant: Mitsubishi Electric Research Laboratories, Inc., Cambridge, MA (US)

(72) Inventors: Yuichi Taguchi, Arlington, MA (US); Yong Xiao, Ann Arbor, MI (US); Vineet R. Kamat, Ann Arbor, MI (US)

(73) Assignee: Mitsubishi Electric Research Labroatories, Inc., Cambridge, MA (US)

( * ) Notice: Subject to any disclaimer, the term of this patent is extended or adjusted under 35 U.S.C. 154(b) by 0 days.

(21) Appl. No.: 15/420,245

(22) Filed: Jan. 31, 2017

(65) Prior Publication Data

US 2018/0218510 A1    Aug. 2, 2018

(51) Int. Cl.
*G06K 9/00* (2006.01)
*G06T 7/55* (2017.01)
(Continued)

(52) U.S. Cl.
CPC ............. *G06T 7/55* (2017.01); *G06K 9/4604* (2013.01); *G06K 9/6267* (2013.01); *G06T 7/337* (2017.01);
(Continued)

(58) Field of Classification Search
CPC . G06T 7/55; G06T 7/337; G06T 2207/10016; G06T 2207/10028; G06K 6/4604; G06K 9/6267
See application file for complete search history.

(56) References Cited

U.S. PATENT DOCUMENTS 7,860,301 B2* 12/2010 Se .................. G01C 11/06
348/43
8,731,247 B2    5/2014 Pollock
(Continued)

OTHER PUBLICATIONS

B. Zheng, Y. Zhao, J. C. Yu, K. Ikeuchi, and S. C. Zhu, "Beyond point clouds: Scene understanding by reasoning geometry and physics," Proceedings of the IEEE Computer Society Conference on Computer Vision and Pattern Recognition, pp. 3127-3134, Jun. 2013.
(Continued)

*Primary Examiner* — Gregory M Desire
(74) *Attorney, Agent, or Firm* — Gene Vinokur; James McAleenan; Hironori Tsukamoto

(57) ABSTRACT

Systems for completing missing points in a three-dimensional (3D) point cloud. The systems include a 3D sensor for measuring point data of objects in a scene, a processor in connection with the 3D sensor and a memory storing a program and the point data, and a display monitor connected to the processor and the 3D sensor for displaying a completed 3D point cloud, wherein the processor executes instruction steps of the program. The instruction steps include acquiring the point data of the objects to generate the 3D point cloud, wherein the point data include a set of points on the objects, extracting planar segments from the 3D point cloud, identifying connectivity relations and missing points among the planar segments, and filling the missing points in the 3D point cloud to generate the completed 3D point cloud using the planar segments and the connectivity relations.

20 Claims, 11 Drawing Sheets

(51) Int. Cl.
*G06K 9/46* (2006.01)
*G06K 9/62* (2006.01)
*G06T 7/33* (2017.01)

(52) U.S. Cl.
CPC ........... *G06T 2207/10016* (2013.01); *G06T 2207/10028* (2013.01)

(56) References Cited

U.S. PATENT DOCUMENTS

| | | | |
|---|---|---|---|
| 8,861,840 B2 | 10/2014 | Bell et al. | |
| 9,183,631 B2 | 11/2015 | Taguchi et al. | |
| 9,412,040 B2 | 8/2016 | Feng et al. | |
| 9,609,307 B1 * | 3/2017 | Lopez | H04N 13/0022 |
| 9,972,067 B2 * | 5/2018 | Kwon | G06T 3/0068 |
| 10,026,230 B2 * | 7/2018 | Kim | G06T 17/00 |
| 2012/0243774 A1 * | 9/2012 | Chen | G06T 15/205 |
| | | | 382/154 |
| 2014/0132733 A1 | 5/2014 | Mundhenk et al. | |

OTHER PUBLICATIONS

T. Shao, A. Monszpart, Y. Zheng, B. Koo, W. Xu, K. Zhou, and N. J. Mitra, "Imagining the unseen: Stability-based cuboid arrangements for scene understanding," ACM Transactions on Graphics, vol. 33, No. 6, pp. 209:1-209:11, Nov. 2014.

\* cited by examiner

METHOD AND SYSTEM FOR COMPLETING POINT CLOUDS USING PLANAR SEGMENTS

FIELD OF THE INVENTION

The present disclosure relates generally to a method and a system for completing point clouds using planar segments.

BACKGROUND

Three-dimensional (3D) point clouds can be obtained using various sensors such as laser scanners and depth sensors, and are widely used for several applications such as 3D modeling and 3D object recognition. Such 3D point clouds inherently suffer from missing data due to occlusions and sensor limitations such as a limited field of view and measurement range. Completing the missing data in 3D point clouds is important for the subsequent applications, e.g., for 3D modeling to generate models without holes, and for 3D object recognition to achieve high recognition accuracy.

Some methods fill holes in a 3D point cloud using geometric properties such as symmetry and smoothness of the surfaces. Some methods use existing libraries of 3D object models and fit the 3D object models to a 3D point cloud to recover the missing points.

Some methods project a 3D point cloud onto two-dimensional (2D) images and interpolate points in the 3D point cloud using the images; see US20140132733 A1 and U.S. Pat. No. 8,731,247 B2. Some methods give feedback to the user to move the sensor and capture more data in the areas including missing points; see U.S. Pat. No. 8,861,840 B2.

Some methods segment a 3D point cloud into a set of object primitives, and fill points in occluded regions for each object primitive. Support relations among the object primitives are then estimated based on a physical reasoning. In some methods, a 3D point cloud is segmented into a set of cuboids, the cuboids are extrapolated into occluded regions, and their support relations and arrangement are estimated, which make the cuboids physically stable. The extrapolated cuboids are used to fill points in the occluded regions. However, those methods are time-consuming, and there is a need to develop a more efficient system or method for completing the missing data in 3D point clouds.

SUMMARY

Some embodiments of the present disclosure provide systems and methods that can extract planar segments, infer connectivity relations among the planar segments, and recover missing points in a 3D point cloud.

The present disclosure is based on the realization that scenes that are of interest to many 3D scanning and modeling applications are dominated by planar structures. Examples include indoor scenes of office buildings, residential houses, and factory floors, as well as outdoor scenes of urban environments. The present disclosure thus focuses on completing points based on planar segments and generating piecewise planar 3D models without holes.

Another realization of the present disclosure is that measurements obtained with 3D sensors provide not only 3D locations in a scene occupied by objects, but also the information whether the 3D locations in the scene are free space or unknown state: The 3D locations should be free space if they are in front of the objects measured by the 3D sensors, while the 3D locations are unknown state if they are behind the objects measured by the 3D sensors. The present disclosure constructs from the 3D sensor measurements a signed distance field (SDF) to classify each 3D location of the scene into occupied, free space, or unknown. The present disclosure then tries to fill the unknown 3D locations on the planar segments if there are sufficient evidence obtained from the planar segments, while keeping the free space 3D locations unchanged.

Yet another realization of the present disclosure is that since a focus of the present disclosure is on completing points on the planar segments, the SDF can be defined on each planar segment, each with a 2D coordinate system, instead of defining the SDF for an entire 3D space using a 3D coordinate system. This reduces computational costs and memory consumptions, leading to faster computational speed.

According to some embodiments of the present disclosure, a system for completing missing points in a three-dimensional (3D) point cloud includes a 3D sensor for measuring point data of objects in a scene; a processor in connection with the 3D sensor and a memory storing a program and the point data, wherein the processor executes instruction steps of the program, the steps comprise: acquiring the point data of the objects to generate the 3D point cloud, wherein the point data include a set of points on the objects; extracting planar segments from the 3D point cloud; identifying connectivity relations and missing points among the planar segments; and filling the missing points in the 3D point cloud to generate a completed 3D point cloud using the planar segments and the connectivity relations; and a display monitor connected to the processor and the 3D sensor for displaying the completed 3D point cloud.

Further, an embodiment of the present disclosure provides a method for completing missing points in a 3D point cloud, wherein a processor is in communication with a memory and a 3D sensor. The method includes measuring point data of objects in a scene using the 3D sensor; acquiring the point data of the objects to generate the 3D point cloud, wherein the point data include a set of points on the objects; extracting planar segments from the 3D point cloud; identifying connectivity relations and missing points among the planar segments; and filling the missing points in the 3D point cloud to generate a completed 3D point cloud using the planar segments and the connectivity relations.

Further, another embodiment of the present disclosure provides a non-transitory computer readable storage medium embodied thereon a program executable by a computer for performing a method, the method for completing missing points in a 3D point cloud, wherein a processor is in communication with a memory and a 3D sensor. The method includes measuring point data of objects in a scene using the 3D sensor; acquiring the point data of the objects to generate the 3D point cloud, wherein the point data include a set of points on the objects; extracting planar segments from the 3D point cloud; identifying connectivity relations and missing points among the planar segments; and filling the missing points in the 3D point cloud to generate a completed 3D point cloud using the planar segments and the connectivity relations.

The system and method for completing point clouds using planar segments according to the present invention improve visual display quality for any 3D modeling and visualization applications.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

Figure 1:
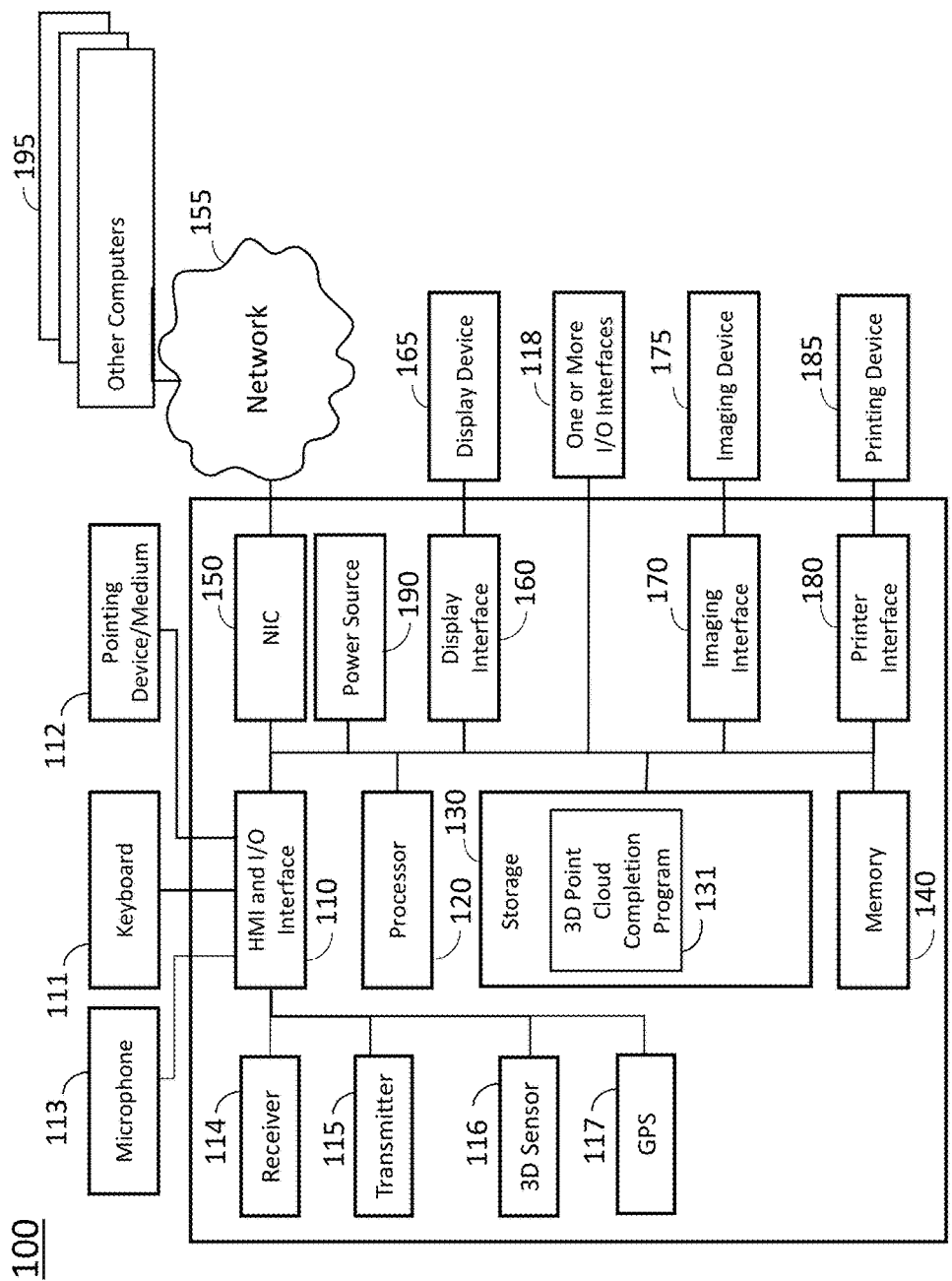
FIG. 1 is a block diagram illustrating a 3D point cloud completion system according to embodiments of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Overview of Embodiments of the Present Disclosure

FIG. 1 is a block diagram illustrating a 3D point cloud completion system 100 according to embodiments of the present disclosure.

The 3D point cloud completion system 100 can include a human machine interface (HMI) with input/output (I/O) interface 110 connectable with a keyboard 111 and a pointing device/medium 112, a microphone 113, a receiver 114, a transmitter 115, a 3D sensor 116, a global positioning system (GPS) 117, one or more I/O interfaces 118, a processor 120, a storage device 130, a memory 140, a network interface controller 150 (NIC) connectable with a network 155 including local area networks and internet network (not shown), a display interface 160 connected to a display device 165, an imaging interface 170 connectable with an imaging device 175, a printer interface 180 connectable with a printing device 185. The HMI with I/O interface 110 may include analog/digital and digital/analog converters. The HMI with I/O interface 110 includes a wireless communication interface that can communicate with other 3D point cloud completion systems or other computers via wireless internet connections or wireless local area networks, which enable to complete multiple 3D point clouds. The 3D point cloud completion system 100 can include a power source 190. The power source 190 may be a battery rechargeable from an external power source (not shown) via the I/O interface 118. Depending upon the application the power source 190 may be optionally located outside of the system 100.

The HMI and I/O interface 110 and the I/O interfaces 118 can be adapted to connect to another display device (not shown) including a computer monitor, camera, television, projector, or mobile device, among others.

The 3D point cloud completion system 100 can receive electric text/imaging documents including speech data via the network 155 connected to the NIC 150. The storage device 130 includes a 3D point cloud completion program 131, in which algorithms of the 3D point cloud completion program 131 are stored into the storage 130 as code data. The algorithms 131 may be stored to a computer readable recording medium (not shown) so that the processor 120 can execute the 3D point cloud completion program according to the algorithms by loading the algorithms from the medium. Further, the pointing device/medium 112 may include modules that read programs stored on a computer readable recording medium.

In order to start acquiring a 3D point cloud using the 3D sensor 116, instructions may be transmitted to the system 100 using the keyboard 111, the pointing device/medium 112 or via the wireless network or the network 190 connected to other computers 195. The acquiring of the 3D point cloud may be started in response to receiving an acoustic signal of a user by the microphone 113 using pre-installed conventional speech recognition program stored in the storage 130.

The processor 120 may be a plurality of processors including one or more graphics processing units (GPUs). The storage 130 may include speech recognition algorithms (not shown) that can recognize speech signals obtained via the microphone 113.

Point Cloud Acquisition Process

Figure 2A:
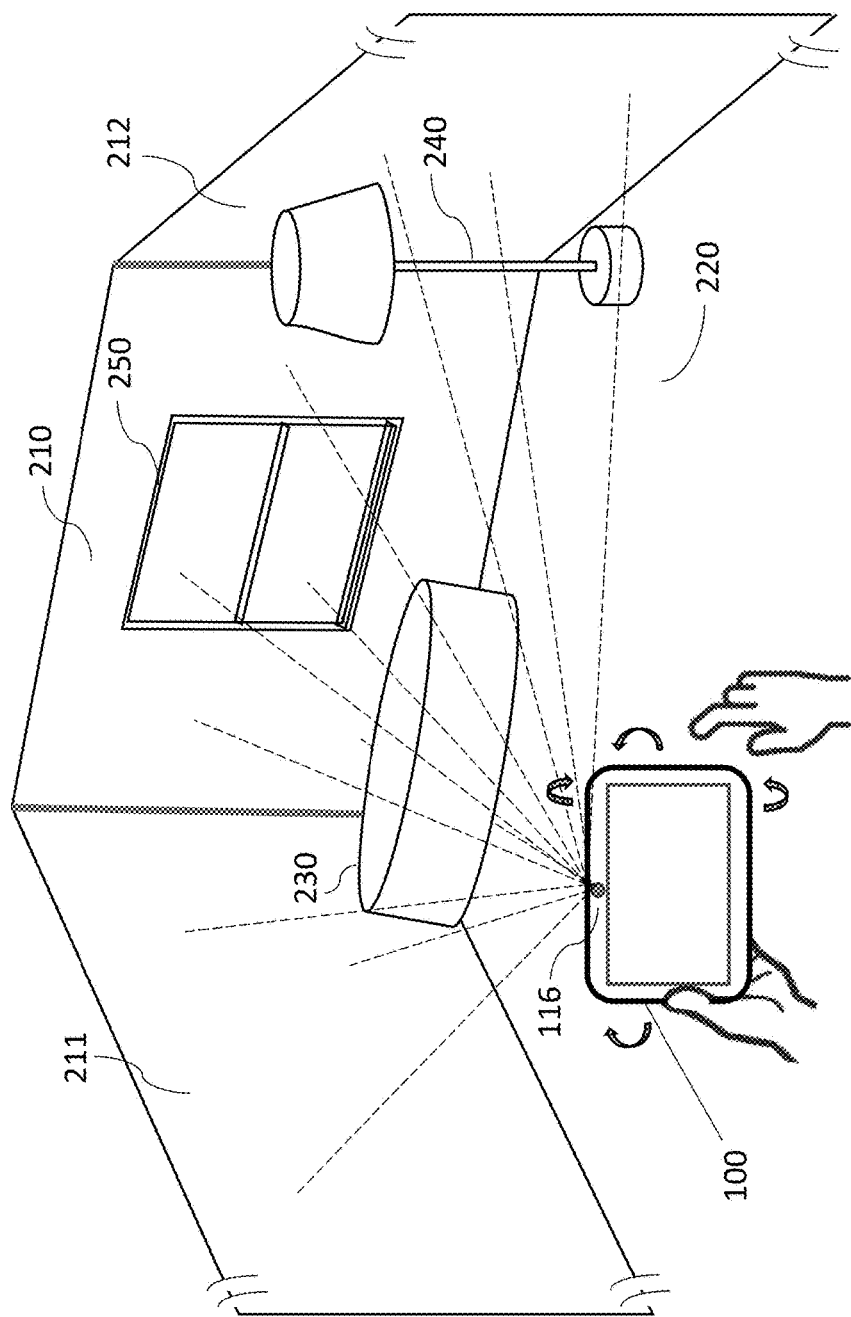
FIG. 2A is an example illustration of acquiring a 3D point cloud using a 3D sensor.

FIG. 2A is an example illustration of acquiring a 3D point cloud using a 3D sensor 116 of the 3D point cloud completion system 100 according to embodiments of the present disclosure. In this example, the 3D point cloud completion system 100 scans point data of objects in a room, including a front wall 210, a left wall 211, a right wall 212, a floor 220, a ceiling (not shown), a table 230, a lamp 240, and a window 250.

The 3D sensor 116 obtains the point data, which include a set of 3D points measured on surfaces of the objects, and the point data are stored into the memory 140 or the storage 130. Data processing is performed for the point data using the processor 120 according to the 3D point cloud completion program 131. Typically the set of 3D points is acquired as a 2D image indicated by pixels, known as a depth image, where each pixel includes a distance measurement to a 3D point on a surface of an object located along a direction of a ray defined by the pixel. For each pixel, the direction of the ray corresponding to the pixel can be recovered by back-projecting the pixel using internal calibration parameters of the 3D sensor, and the 3D point can be recovered on the ray at a 3D location whose distance from the 3D sensor is given by the distance measurement.

Figure 2B:
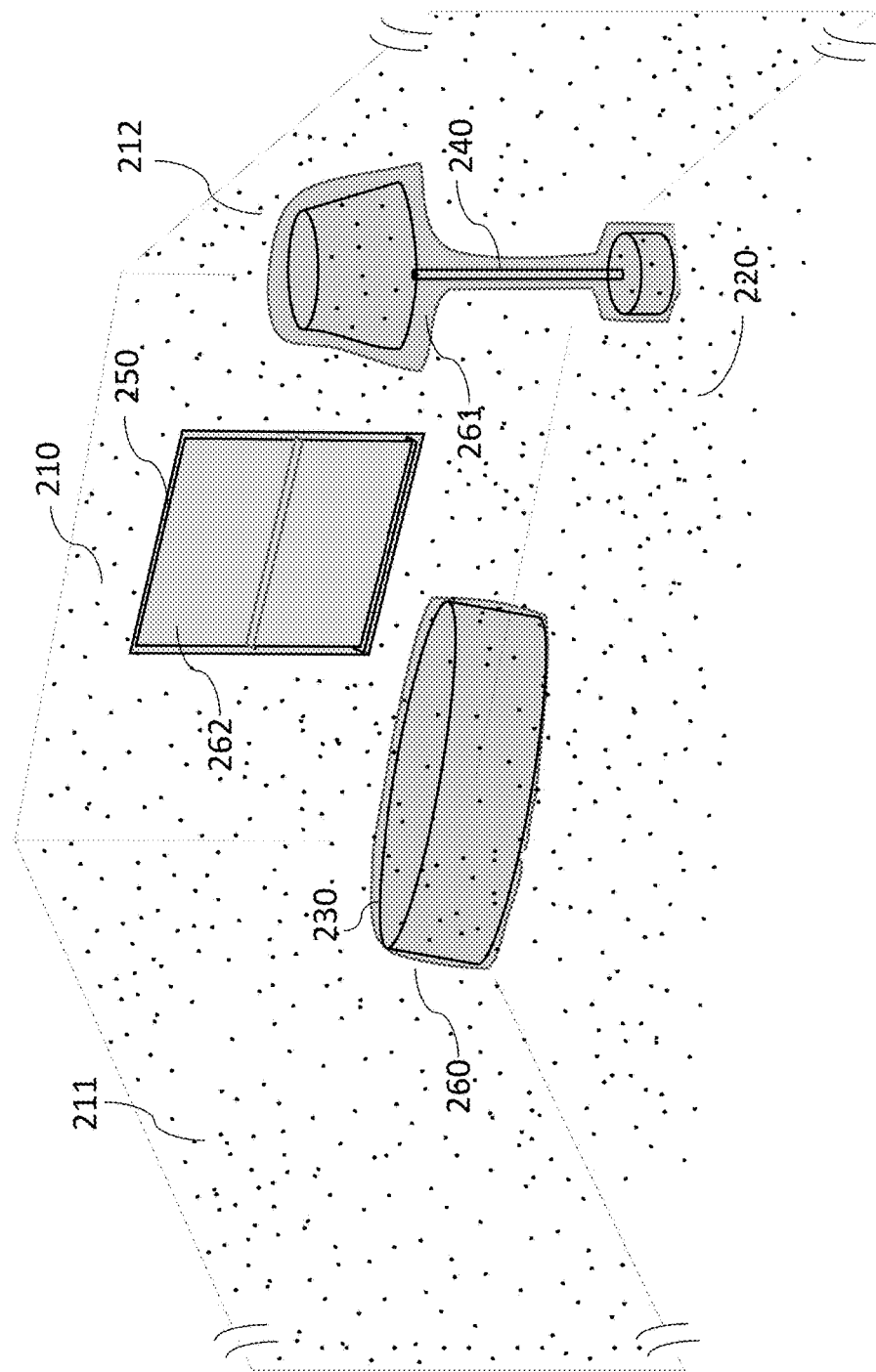
FIG. 2B is an example of a 3D point cloud acquired from FIG. 2A.
Figure 2C:
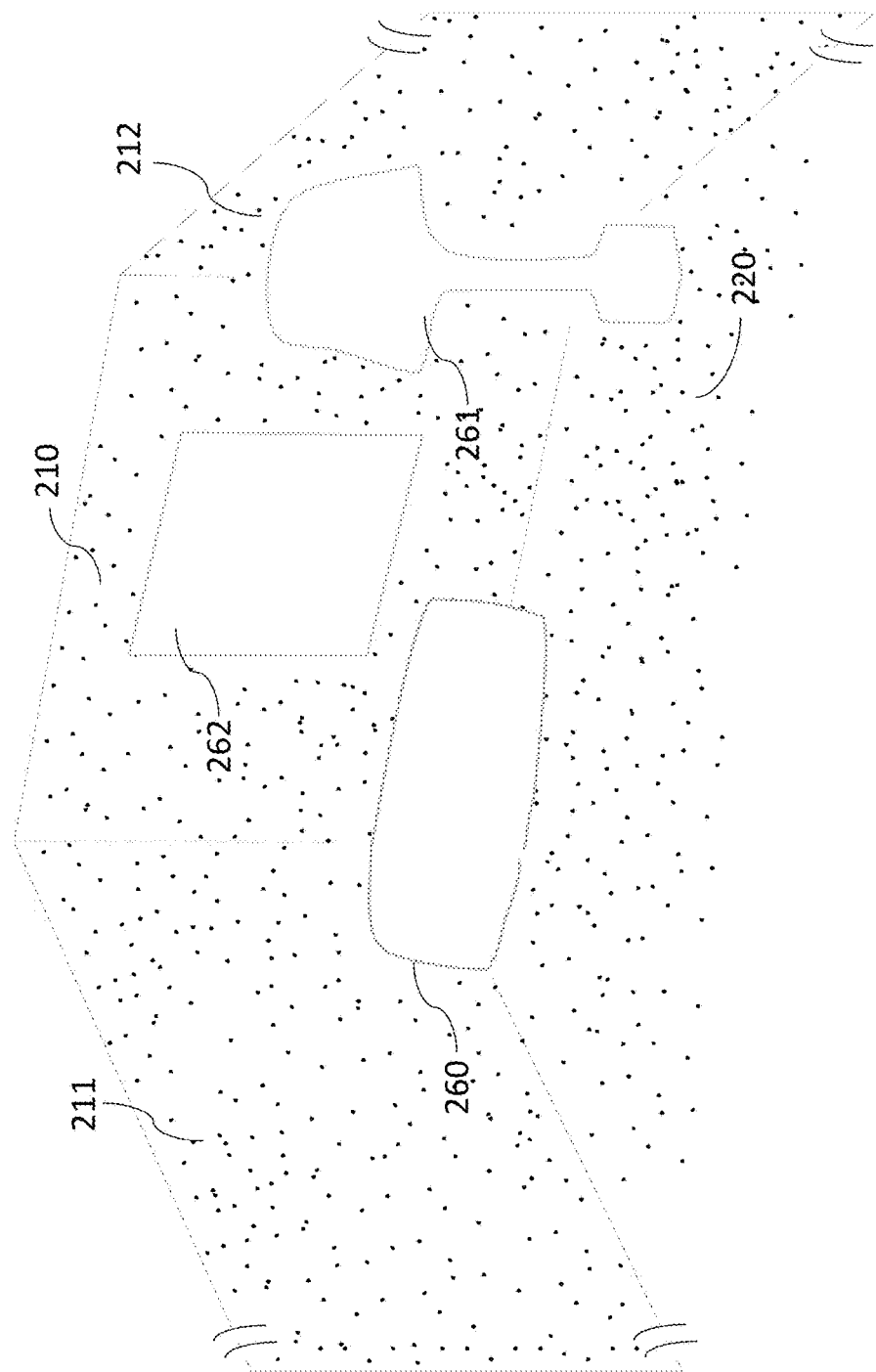
FIG. 2C is an example of a 3D point cloud indicating missing points on planar segments generated by objects.
Figure 2D:
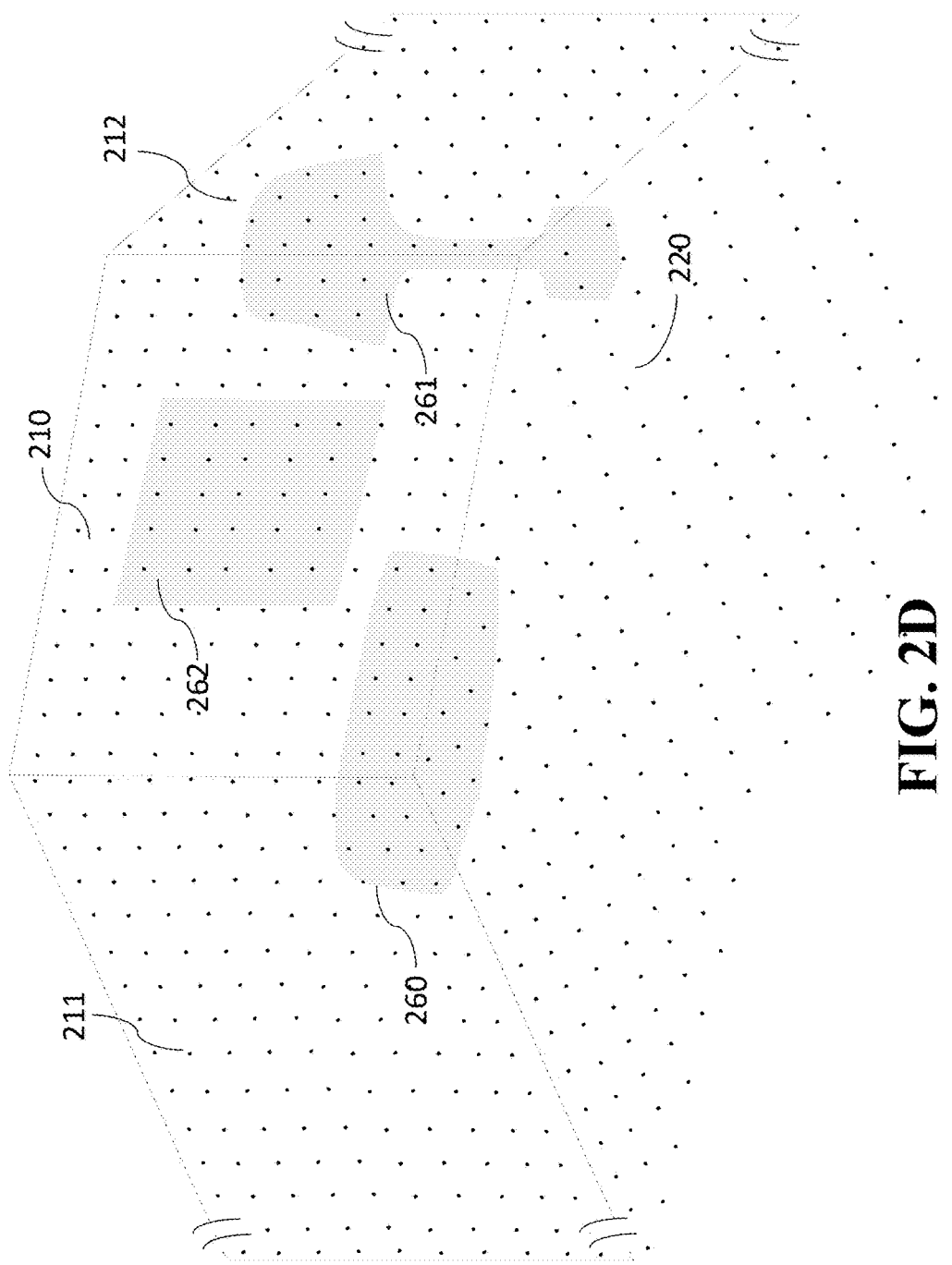
FIG. 2D is an example of a completed 3D point cloud obtained from the 3D point cloud in FIG. 2B.

FIG. 2B shows an example of the point data acquired from the room shown in FIG. 2A, and FIG. 2C shows the point data acquired on planar objects, excluding the point data acquired on the other objects. Note that the 3D sensor 116 obtains the point data only on the surfaces that are in the line of sight of the 3D sensor. Thus regions behind the table 260 and the lamp 261 do not include any 3D points since the regions are occluded by the objects. Also a region corresponding to the window 262 does not include any 3D points since there is no surface that can be measured by the 3D sensor. The goal of the 3D point cloud completion system is to fill missing 3D points in these regions and generate a completed 3D point cloud, as illustrated in FIG. 2D.

In one embodiment of the present disclosure, the 3D point cloud is generated by placing the 3D sensor 116 at a fixed pose. A pose of the 3D sensor 116 includes 3 degree-of-freedom translation (position) and 3 degree-of-freedom rotation (orientation), having a total of 6 degrees of freedom. In this case, the point data are acquired as a single frame (as a depth image) at the fixed pose, and the 3D point cloud is generated by the single frame of the point data. In another embodiment, the 3D point cloud is generated by moving the 3D sensor at different poses, acquiring multiple frames of the point data at the different poses, and registering the multiple frames with each other into a single common coordinate system (or a predetermined single coordinate system) by estimating the different poses of the multiple frames. Such registration can be done by using simultaneous localization and mapping (SLAM) techniques as known in the art. Although registering the multiple frames of the point data acquired at the different poses of the 3D sensor reduces the regions of missing 3D points, some regions (e.g., behind the table) cannot be measured at any pose and remain as missing regions.

Point Cloud Completion Process

Figure 3:
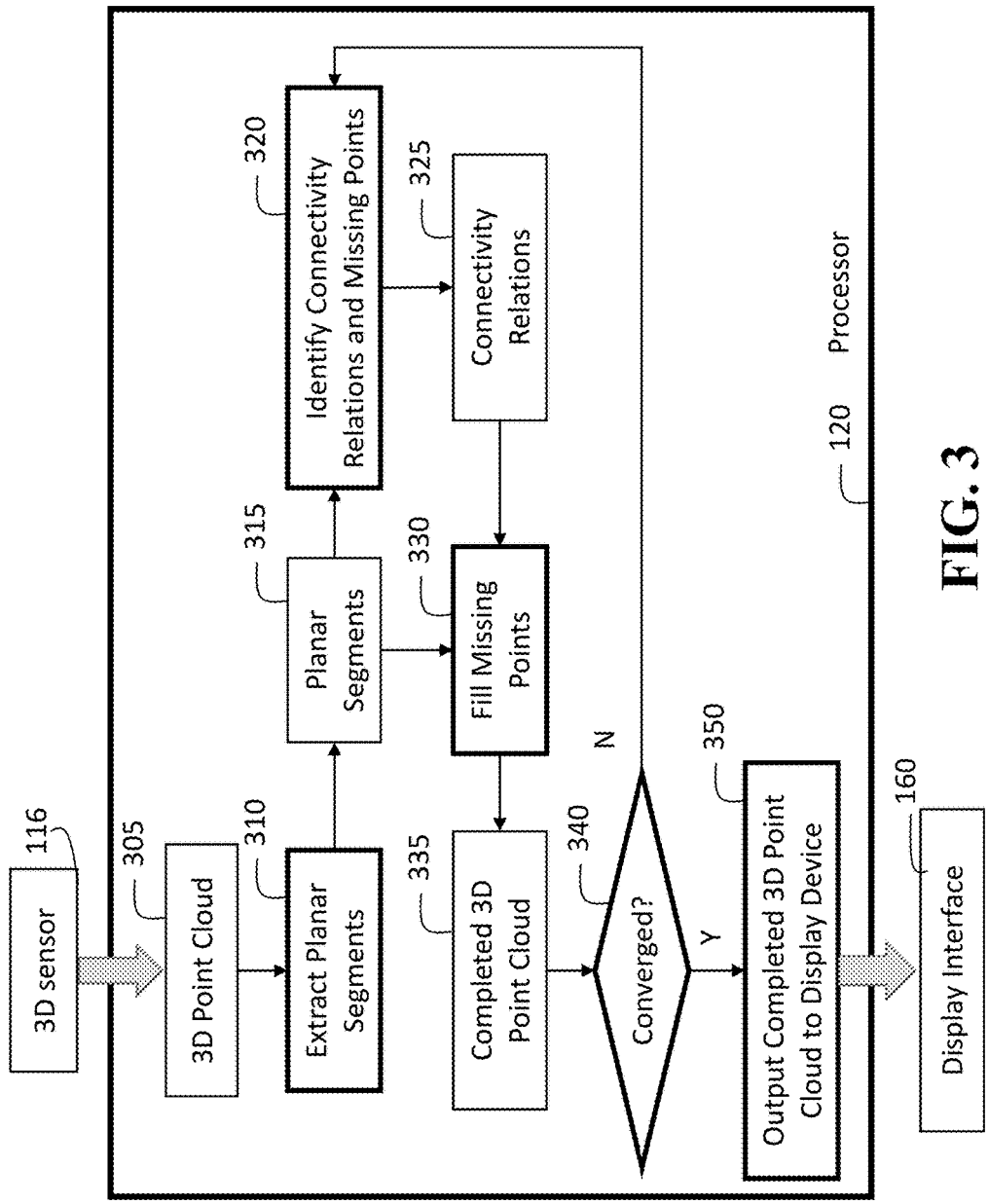
FIG. 3 is a block diagram illustrating a 3D point could completion system for completing a 3D point cloud acquired by a 3D sensor according to an embodiment of the present disclosure.

FIG. 3 is a block diagram illustrating a 3D point cloud completion system 100 according to an embodiment of the present disclosure. Given the 3D point cloud 305 acquired by the 3D sensor 116 as a single frame or a set of multiple frames, the 3D point cloud completion system 100 completes the 3D point cloud by extracting planar segments 315 from the 3D point cloud 305 in step 310, identifying connectivity relations 325 and missing points among the planar segments in step 320, and filling the missing points using the planar segments 315 and the connectivity relations 325 in step 330 to generate a completed 3D point cloud 335.

For extracting planar segments from a 3D point cloud, various methods are known in the art. Some methods extract planar segments directly from the 3D point cloud in the 3D space. Those methods need to perform a nearest neighbor search in the 3D space to determine spatially close 3D points belonging to the same planar segment, which is typically time-consuming. For more efficient processing, some embodiments of the present disclosure extract planar segments from the 2D depth image used to generate the 3D point cloud, where spatially close 3D points can be easily determined as pixel neighbors on the 2D image grid.

In a preferred embodiment of the present disclosure, the planar segments are extracted from the depth image. When the 3D point cloud is generated by registering multiple frames of the depth images, the planar segments are extracted from each of the depth images and registered with each other according to the estimated poses of the frames. Note that the registered planar segments having similar plane equations and being spatially close with each other are merged together. The merged planar segments can be used to refine the estimated poses of the frames and the plane equations of the planar segments using a bundle adjustment procedure.

Once the planar segments are extracted, the 3D point cloud completion system 100 identifies connectivity relations and missing points among the planar segments. A pair of two planar segments is defined as connected if the two planar segments physically share a 3D line segment (e.g., the front wall and the floor in the example scene shown in FIG. 2A). There is most likely no physical gap between the connected planar segments and the connected planar segments should be connected in the 3D space. Thus the 3D point cloud completion system 100 fills missing regions (points) between the connected planar segments (e.g., the regions 260 and 261 in FIG. 2B) by adding 3D points on the planar segments.

For identifying the connectivity relations, an embodiment of the present disclosure uses a signed distance field (SDF). The SDF stores a signed distance value at each 3D location in the 3D space. Each 3D location in the 3D space is referred to as a voxel, and typically the 3D space is uniformly discretized using a 3D grid of uniform-sized voxels. For example, each voxel corresponds to a physical space of 1 cm×1 cm×1 cm. Data structures such as an octree can be used to efficiently store only necessary voxels. The signed distance value represents the distance to the closest object surface from the voxel: the signed distance value is zero if the voxel is on an object surface, positive if the voxel is in front of an object surface, and negative if the voxel is behind an object surface. Once the SDF is obtained, each voxel can be classified into three types: an occupied voxel, a free space voxel, and an unknown voxel, if the signed distance value is sufficiently close to zero (within a threshold or predetermined range), sufficiently positive, and sufficiently negative, respectively. For instance, when the signed distance value is in a predetermined range including zero, the corresponding voxel is classified as an occupied voxel. In this case, the predetermined range has a positive limit value in a positive value side and a negative limit value in a negative value side. In other words, when the signed distance value is in the predetermined range, the corresponding voxel is approximately located on the surface of an object. When a signed distance value is beyond the positive limit of the predetermined range in the positive side, the corresponding voxel is classified as a free space voxel. Further, when a signed distance value is beyond the negative limit of the predetermined range in the negative side, the corresponding voxel is classified as an unknown voxel.

Figure 4:
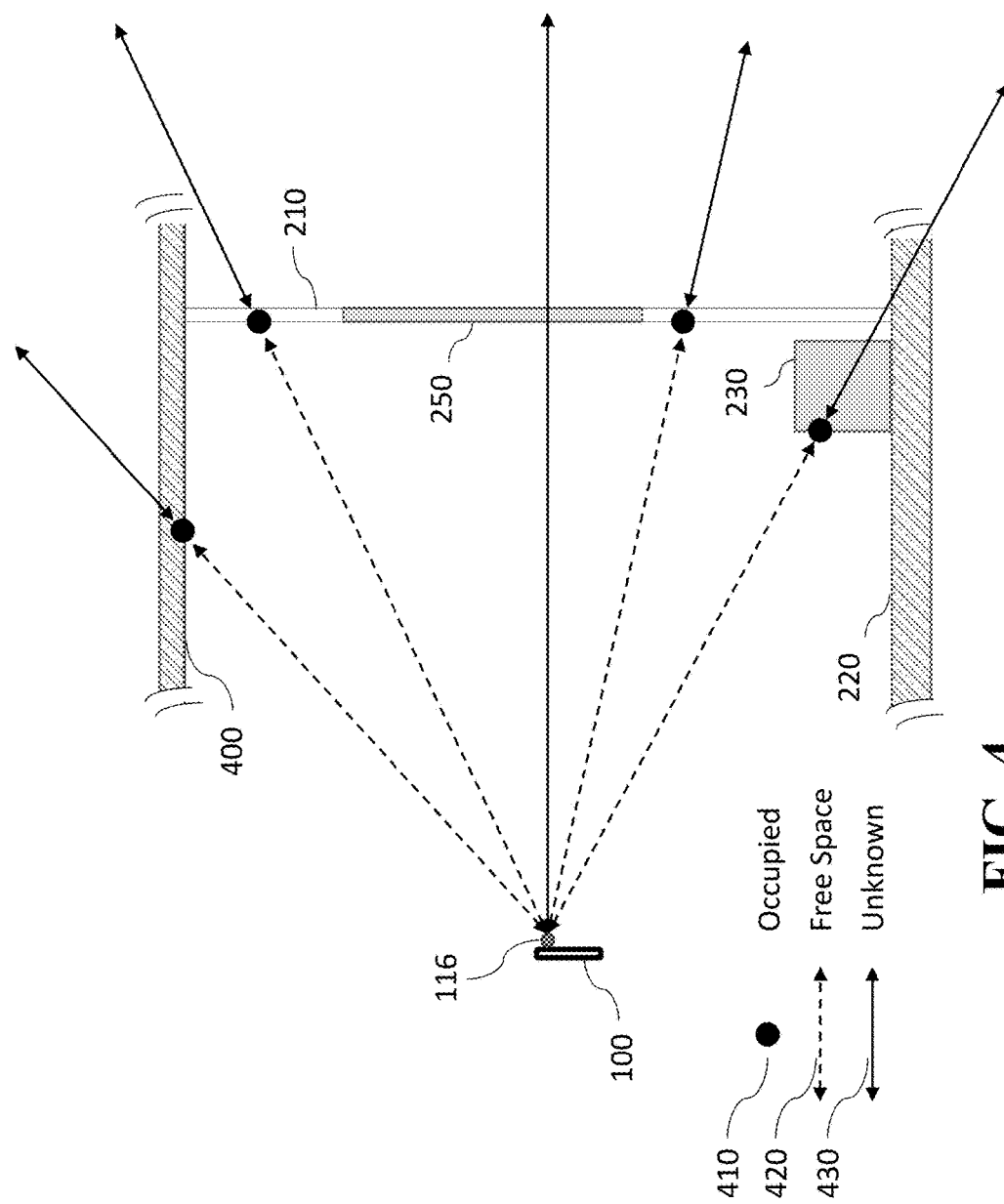
FIG. 4 shows a cross sectional view of FIG. 2B for illustrating geometric relations between a 3D sensor and points measured on objects.

The embodiment of the present disclosure generates the SDF from the 3D point cloud using approximated signed distance values that are determined only along the ray directions from the 3D sensor. This process is illustrated in FIG. 4, showing a cross sectional view of the example scene shown in FIG. 2A. For each ray direction with respect to the 3D sensor 116, the 3D sensor 116 measures 3D points on the surfaces of objects, such as a ceiling 400, the front wall 210, and the table 230. The voxels at the 3D points on the object surfaces will have a zero signed distance value, corresponding to occupied voxels 410. Voxels in front of the 3D points on the object surfaces will have positive signed distance values whose absolute values denote the distances between the 3D points and the voxels, indicated as free space voxels 420 in FIG. 4. Voxels behind the 3D points on the object surfaces will have negative signed distance values whose absolute values denote the distances between the 3D points and the voxels, indicated as unknown voxels 430. Note that the ray passing through the window 250 does not have a 3D point measurement, since there is no object surface along the ray direction. The voxels on the passing-through ray will have a predetermined unknown distance value (e.g., a negative infinite value) and are classified as unknown voxels 430. If the 3D point cloud is generated from a single frame of the point data, the SDF as determined above can be directly used. If the 3D point cloud is generated from multiple frames of the point data, the SDF is first individually determined for each frame using the estimated pose of the 3D sensor 116 and then the multiple SDFs are averaged to generate a single SDF. In the latter case, the signed distance values in each SDF are typically truncated with a threshold before averaged.

Figure 5A:
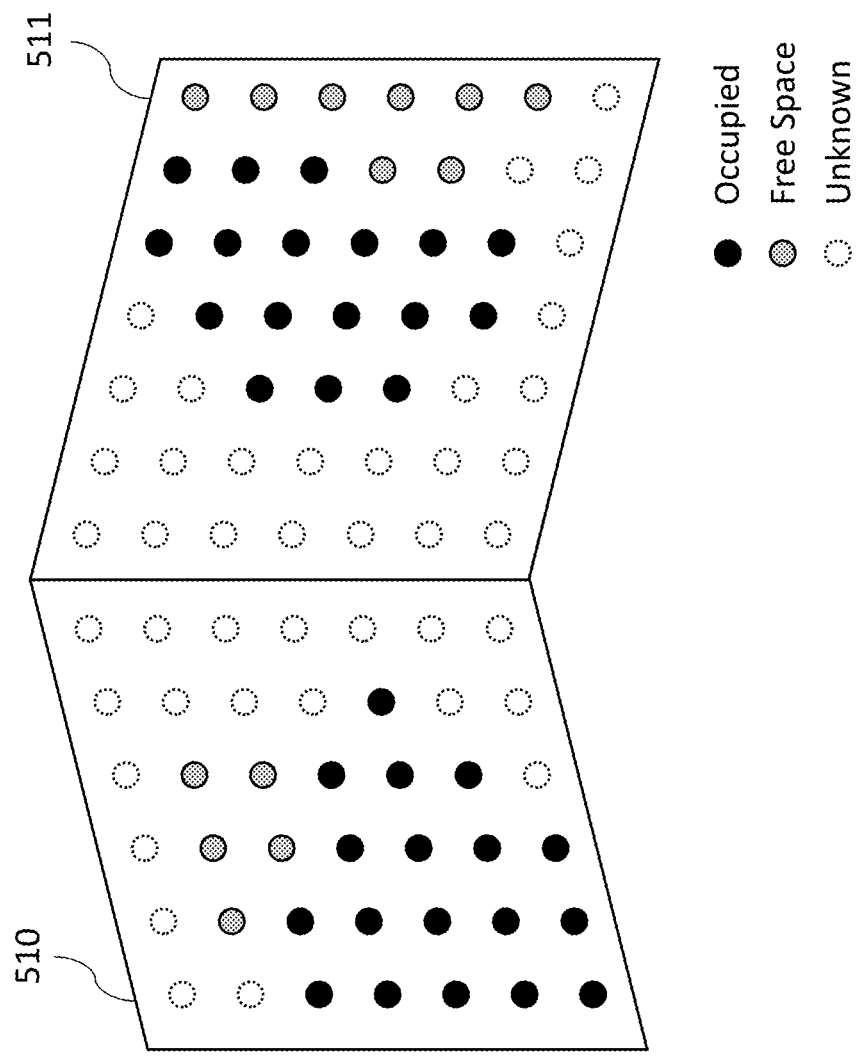
FIGS. 5A-5D show a procedure for completing 3D points between two planar segments according to an embodiment of the present disclosure.
Figure 5B:
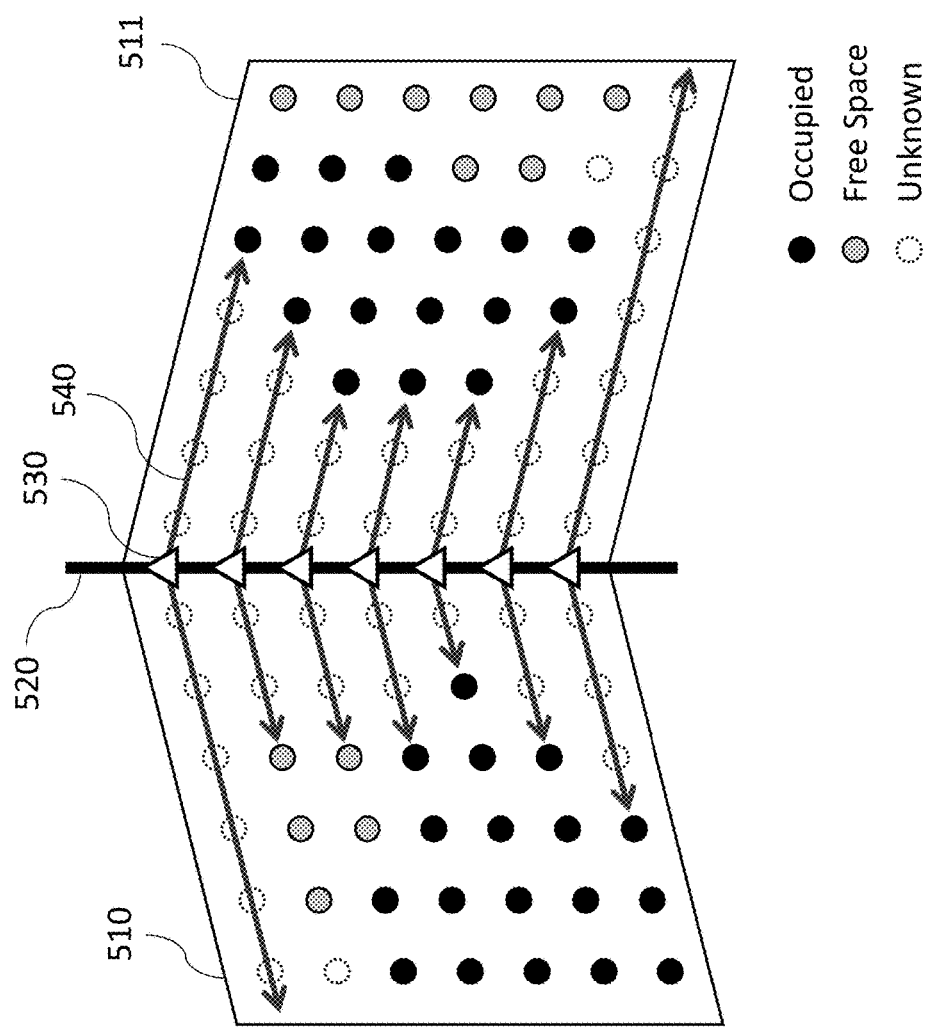
Figure 5C:
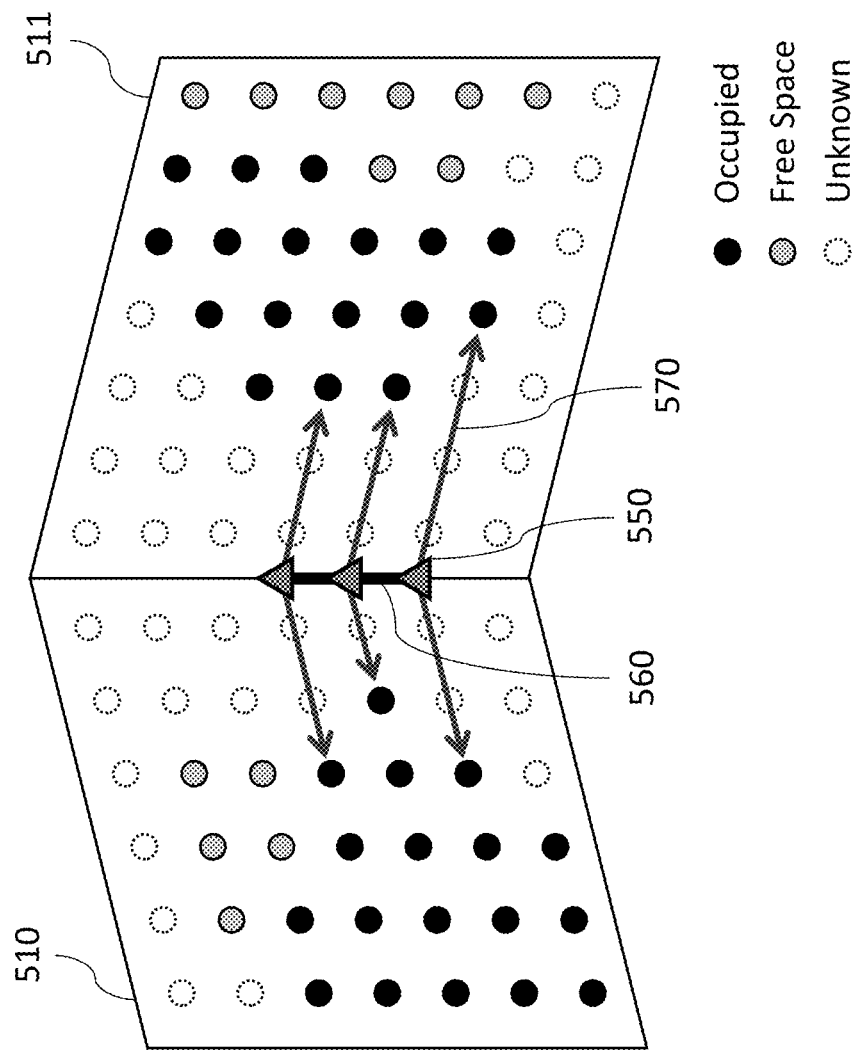

Given the classified voxels obtained from the SDF, the 3D point cloud completion system 100 identifies the connectivity relation for every pair of two planar segments and missing points. This procedure is illustrated in FIG. 5A to FIG. 5D and detailed as follows. Let us consider a pair of two planar segments 510 and 511 as shown in FIG. 5A. Note that the voxels are defined in the 3D space on a 3D grid, and thus are not exactly located on the planar segments in general. However, for illustration purpose, FIG. 5A shows the voxels as if they are exactly located on the planar segments. In practice, the system 100 finds a nearest neighbor voxel from each 3D location on the planar segments to perform the following procedure. For the pair of the two planar segments, as shown in FIG. 5B, the system 100 first determines a 3D intersection line 520 as an intersection of the two planar segments by considering each planar segment as an infinite plane. The system 100 then processes each 3D point 530 on the 3D intersection line according to the instructions described in the 3D point cloud completion program 131 using the processor 120: From each 3D point 530, the system 100 walks (scans) 540 on each of the two planar segments toward a direction orthogonal to the 3D intersection line direction until the system 100 finds a first voxel that is either occupied or free space, while ignoring unknown voxels. If the first found voxel is an occupied voxel on both of the two planar segments, then the 3D point is marked as a candidate connected 3D point 550, as shown in FIG. 5C. After processing (scanning) all the 3D points 530 on the 3D intersection line 520, candidate connected 3D points 550 are clustered into a set of candidate connected 3D line segments 560. In the set of candidate connected 3D line segments, 3D line segments whose lengths are greater than a threshold (e.g., 10 cm) are finally selected as a set of connected 3D line segments, and the pair of two planar segments that has at least one connected 3D line segment is considered connected. The above procedure ensures that a majority of voxels between the two planar segments are either occupied or unknown voxels without many free space voxels for the two planar segments to be considered connected; that is, two planar segments are identified as connected if a majority of voxels between the two planar segments are either occupied or unknown voxels. Pairs of two planar segments that are parallel with each other are always not connected and are ignored in this procedure.

Note that several variant strategies and thresholds can be used in the above procedure for identifying the connectivity relations. For example, the 3D point may be marked as the candidate connected 3D point if at least one of the first found voxels is an occupied voxel (not necessarily both of the first found voxels). When the system 100 walks to find the first voxel, a distance threshold (e.g., 50 cm) may be used such that the first found voxel is not too far from the 3D intersection line. Parallel planar segments can be determined using a threshold on an angle between normals of the planar segments. For example, two planar segments are considered parallel if the angle between the normals of the planar segments is smaller than 5 degrees. This angle threshold may be adjusted such that the system 100 processes only pairs of two planar segments that are close to be orthogonal with each other. For example, if the angle threshold is set to 85 degrees, two planar segments are considered parallel and ignored if the angle between the normals of the planar segments is smaller than 85 degrees; this is equivalent to processing two planar segments only if the angle between the normals of the planar segments is larger than or equal to 85 degrees, i.e., if the two planar segments are close to be orthogonal with each other.

Figure 5D:
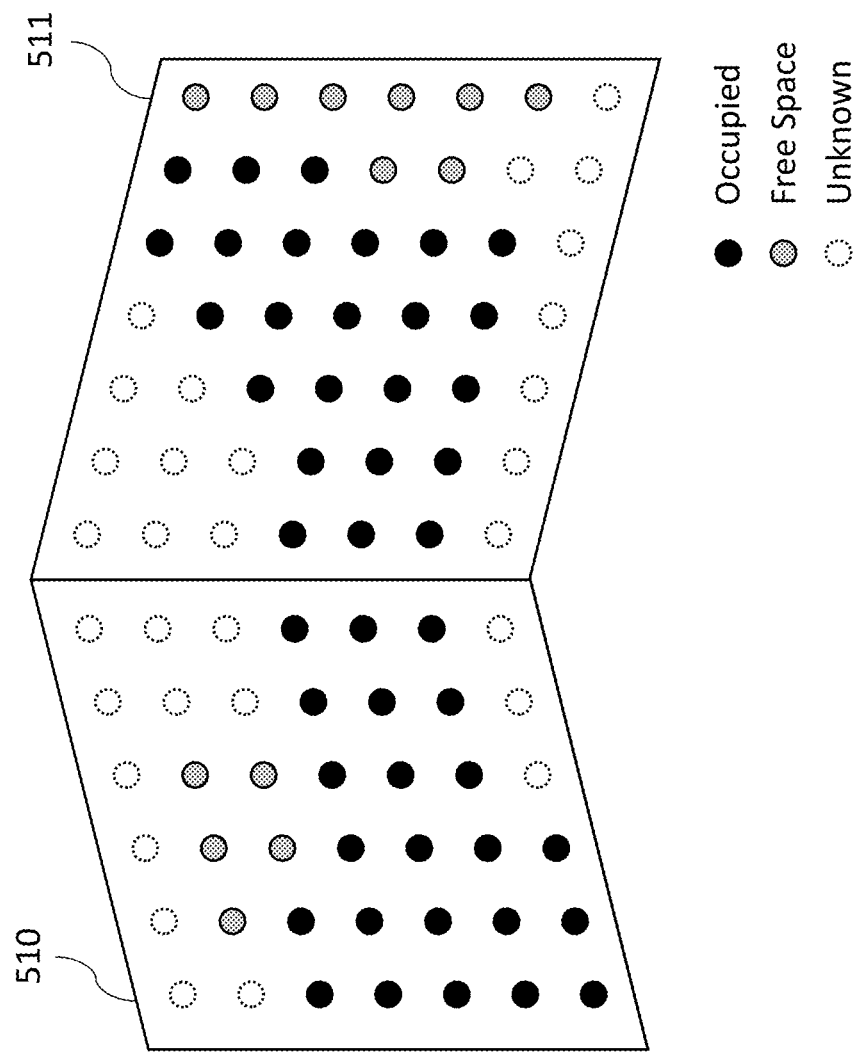

The 3D point cloud completion system 100 uses the set of connected 3D line segments 560 to fill missing points between the connected planar segments. Starting from each 3D point 550 on each of the connected 3D line segments 560, the system 100 walks 570 on each of the two planar segments toward the direction orthogonal to the 3D intersenction line direction until the system 100 finds the first voxel that is occupied (this time it cannot be free space). During this process, the unknown voxels are identified as missing points by the system 100, and filled with and updated as occupied voxels, as shown in FIG. 5D.

The 3D point cloud completion system 100 also uses each planar segment to fill missing points on the planar segment. For example, a set of unknown voxels surrounded by occupied voxels on a planar segment (e.g., the window region 262 in FIG. 2B) are identified as missing points, and the missing points can be filled as occupied voxels. If it is preferred not to fill such a region, a threshold on a number of unknown voxels included in the region may be used (e.g., a region is filled only if the number of unknown voxels included in the region is smaller than 100). On the other hand, a set of free space voxels on a planar segment should not be filled. Such an example can be illustrated if we assume that in the example room scene in FIG. 2A and FIG. 2B, the window 250 is facing toward a corridor and the 3D sensor 116 measures a wall of the corridor located at an opposite side of the room through the window. In such a case, the window region 262 is a set of free space voxels since the 3D sensor measures 3D points on the wall of the corridor located behind the window, and thus the window region 262 should not be filled since the free space voxels indicate the existence of an open area.

The processes of identifying the connectivity relations and filling the missing points can be repeated until a convergence is confirmed in step 340 by using an updated set of classified voxels obtained from the filling process as an input to the identifying process. The convergence can be determined if the updated set of classified voxels is identical to an input set of classified voxels; i.e., the processes can be repeated if at least one missing point is filled in the filling process.

As described above, the 3D point cloud completion system 100 uses the SDF and the classified voxels for identifying the connectivity relations and filling the missing points. One embodiment of the present disclosure realizes that these processes access only the classified voxels located on the planar segments. This realization suggests that the SDF and the classified voxels need to be determined and stored only on the planar segments for faster processing speed and memory efficiency. Accordingly, the embodiment of the present disclosure defines a 2D SDF for each planar segment that can be accessed using 2D coordinates, instead of defining a 3D SDF for an entire 3D space that needs to be accessed using 3D coordinates. A set of 2D SDFs defined for the planar segments, as well as classified voxels in the 2D SDFs, can be determined using the same procedure that is used for determining the 3D SDF.

An output of the 3D point cloud completion system is a completed 3D point cloud, including a set of occupied voxels. The output can be also considered a piecewise planar 3D model, including a set of completed planar segments. Each of the completed planar segments can be represented as a set of occupied voxels belonging to the planar segment, or a set of boundary polygons that enclose the occupied voxels belonging to the planar segment.

Applications

The completed 3D point cloud can provide better visual display quality for any 3D modeling and visualization applications. The completed 3D point cloud can be also useful for 3D-model-based simulations, in particular when a leak of simulated entities from a 3D model is a significant issue. Examples include simulating air flow and heat transfer, simulating radio wave propagation for WiFi and cellular networks, and simulating visible light propagation. Such simulations are of general interest in building information modeling (BIM).

Although the focus of the present disclosure is generating a piecewise planar 3D model including completed planar segments, non-planar 3D points located on non-planar object surfaces can be added to an output 3D model. The non-planar 3D points can be found in the planar segment extraction process as 3D points that do not belong to any planar segment.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Further, use of ordinal terms such as first, second, in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. A system for completing missing points in a three-dimensional (3D) point cloud comprising:
 a 3D sensor for measuring point data of objects in a scene;
 a processor in connection with the 3D sensor and a memory storing a program and the point data, wherein the processor executes instruction steps of the program, the steps comprise:
  acquiring the point data of the objects to generate the 3D point cloud, wherein the point data include a set of points on the objects;
  extracting planar segments from the 3D point cloud;
  identifying connectivity relations and missing points among the planar segments; and
  filling the missing points in the 3D point cloud to generate a completed 3D point cloud using the planar segments and the connectivity relations; and
 a display monitor connected to the processor and the 3D sensor for displaying the completed 3D point cloud.

2. The system of claim 1, wherein the steps of the identifying and filling are repeated if at least one missing point is filled in the filling step.

3. The system of claim 1, wherein the 3D point cloud is generated from a single frame of the point data acquired by placing the 3D sensor at a fixed pose.

4. The system of claim 1, wherein the 3D point cloud is generated from multiple frames of the point data acquired by moving the 3D sensor at different poses and by registering the multiple frames into a common coordinate system.

5. The system of claim 4, wherein the planar segments are extracted from each of the multiple frames of the point data and registered into the common coordinate system.

6. The system of claim 1, wherein the steps of the identifying and filling use a signed distance field, wherein the signed distance field includes a signed distance value for each voxel in the scene.

7. The system of claim 6, wherein each voxel is classified as an occupied voxel if the signed distance value is in a predetermined range, wherein each voxel is classified as a free space voxel if the signed distance value is beyond a positive limit of the predetermined range in a positive side, and wherein each voxel is classified as an unknown voxel if the signed distance value is beyond a negative limit of the predetermined range in a negative side.

8. The system of claim 7, wherein two planar segments are identified as connected if a majority of voxels between the two planar segments are either occupied or unknown voxels.

9. The system of claim 8, wherein the unknown voxels between the two planar segments identified as connected are filled and updated as occupied voxels.

10. The system of claim 6, wherein the signed distance field is generated from the point data using approximated signed distance values and the approximated signed distance values are determined along each ray direction of the 3D sensor.

11. The system of claim 6, wherein the signed distance field is defined in a 3D space.

12. The system of claim 6, wherein the signed distance field is defined on each of the planar segments.

13. A method for completing missing points in a 3D point cloud, wherein a processor is in communication with a memory and a 3D sensor, the method comprising:
measuring point data of objects in a scene using the 3D sensor;
acquiring the point data of the objects to generate the 3D point cloud, wherein the point data include a set of points on the objects;
extracting planar segments from the 3D point cloud;
identifying connectivity relations and missing points among the planar segments; and
filling the missing points in the 3D point cloud to generate a completed 3D point cloud using the planar segments and the connectivity relations.

14. The method of claim 13, wherein the steps of the identifying and filling are repeated if at least one missing point is filled in the filling step.

15. The method of claim 13, wherein the 3D point cloud is generated from a single frame of the point data acquired by placing the 3D sensor at a fixed pose.

16. The method of claim 13, wherein the 3D point cloud is generated from multiple frames of the point data acquired by moving the 3D sensor at different poses and by registering the multiple frames into a common coordinate system.

17. The method of claim 13, wherein the steps of the identifying and filling use a signed distance field, wherein the signed distance field includes a signed distance value for each voxel in the scene.

18. A non-transitory computer readable storage medium embodied thereon a program executable by a computer for performing a method, the method for completing missing points in a 3D point cloud, wherein a processor is in communication with a memory and a 3D sensor, the method comprising:
measuring point data of objects in a scene using the 3D sensor;
acquiring the point data of the objects to generate the 3D point cloud, wherein the point data include a set of points on the objects;
extracting planar segments from the 3D point cloud;
identifying connectivity relations and missing points among the planar segments; and
filling the missing points in the 3D point cloud to generate a completed 3D point cloud using the planar segments and the connectivity relations.

19. The storage medium of claim 18, wherein the steps of the identifying and filling are repeated if at least one missing point is filled in the filling step.

20. The storage medium of claim 18, wherein the steps of the identifying and filling use a signed distance field, wherein the signed distance field includes a signed distance value for each voxel in the scene.

* * * * *